US011273790B2

(12) United States Patent
Hamilton et al.

(10) Patent No.: US 11,273,790 B2
(45) Date of Patent: Mar. 15, 2022

(54) HEIGHT ADJUSTERS WITH ANTI-CINCH FEATURES FOR OCCUPANT RESTRAINT SYSTEMS

(71) Applicant: Shield Restraint Systems, Inc., Elkhart, IN (US)

(72) Inventors: Ruth Ann Hamilton, Elkhart, IN (US); Wayne Deyo Carter, Elkhart, IN (US); Matt Robert McCollough, Elkhart, IN (US); Mikail Paulo Gagasca Santiaguel, Elkhart, IN (US); Collyn William Bennett, Elkhart, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 0 days.

(21) Appl. No.: 16/293,517

(22) Filed: Mar. 5, 2019

(65) Prior Publication Data

US 2019/0275982 A1    Sep. 12, 2019

Related U.S. Application Data

(60) Provisional application No. 62/639,251, filed on Mar. 6, 2018.

(51) Int. Cl.
*B60R 22/20* (2006.01)
*B60R 22/28* (2006.01)
(Continued)

(52) U.S. Cl.
CPC .......... *B60R 22/202* (2013.01); *B60R 21/055* (2013.01); *B60R 22/203* (2013.01); *B60R 22/28* (2013.01); *B60R 2022/1818* (2013.01)

(58) Field of Classification Search
CPC ....... B60R 22/19; B60R 22/202; B60R 22/28; B60R 2022/1818; B60R 22/201; B60R 22/30; B60R 22/203; B60R 21/055
See application file for complete search history.

(56) References Cited

U.S. PATENT DOCUMENTS

| 2,443,191 A | 6/1948 | Miller |
| 3,074,760 A | 1/1963 | Hodgekin |

(Continued)

FOREIGN PATENT DOCUMENTS

| CA | 2086479 | 7/1993 |
| CA | 2038122 | 11/2000 |

(Continued)

OTHER PUBLICATIONS

Child Restraint Systems, Department of Aviation Administration, Federal Aviation Adm. 14 CFR, Aug. 2005.
(Continued)

*Primary Examiner* — Frank B Vanaman
(74) *Attorney, Agent, or Firm* — Perkins Coie LLP

(57) ABSTRACT

Shock absorbing seat belt height adjusters for use with vehicle occupant restraint systems, and associated systems and methods. In one embodiment, a shock absorbing height adjuster includes an adjustable D-ring that is operably coupled to an anchor point on a vehicle frame near a seat occupant's shoulder. The height adjuster can include an anti-cinch feature that enables the D-ring to elastically respond to tension loads in a shoulder web portion of the occupant restraint through at least an initial portion of D-ring movement.

16 Claims, 8 Drawing Sheets

(51) Int. Cl.
 *B60R 21/055* (2006.01)
 *B60R 22/18* (2006.01)

(56) References Cited

U.S. PATENT DOCUMENTS

| | | | |
|---|---|---|---|
| 3,409,327 A | 11/1968 | Radke | |
| 3,550,957 A | 12/1970 | Booth | |
| 3,563,498 A | 2/1971 | Haile | |
| 3,804,698 A * | 4/1974 | Kinloch | F16F 7/12 428/176 |
| 4,027,905 A | 6/1977 | Shimogawa | |
| 4,060,278 A | 11/1977 | Maeyerspeer | |
| 4,243,266 A | 1/1981 | Anderson | |
| 4,527,830 A | 7/1985 | Meyers | |
| 4,552,407 A * | 11/1985 | Takada | B60R 22/1855 24/579.11 |
| 4,624,479 A * | 11/1986 | Grunewald | B60R 22/201 280/801.2 |
| 4,640,550 A * | 2/1987 | Håkansson | B60R 22/203 280/801.2 |
| 4,660,889 A | 4/1987 | Anthony et al. | |
| 4,679,852 A | 7/1987 | Anthony et al. | |
| 4,738,485 A | 4/1988 | Rumpf | |
| 4,787,677 A | 11/1988 | Reighter | |
| 4,826,246 A | 5/1989 | Meeker | |
| 4,884,652 A | 12/1989 | Vollmer | |
| 4,948,199 A | 8/1990 | Weller | |
| 5,031,962 A | 7/1991 | Lee | |
| 5,039,169 A | 8/1991 | Bougher et al. | |
| 5,061,012 A | 10/1991 | Parker et al. | |
| 5,113,981 A * | 5/1992 | Lantz | F16F 7/006 182/3 |
| 5,143,420 A | 8/1992 | Switlik | |
| 5,219,203 A | 7/1993 | Switlik | |
| 5,265,828 A | 11/1993 | Bennington | |
| 5,283,933 A | 2/1994 | Wiseman et al. | |
| 5,286,090 A | 2/1994 | Templin et al. | |
| 5,333,935 A * | 8/1994 | DiPaola | B60R 22/28 297/471 |
| 5,366,243 A * | 11/1994 | Ray | B60R 22/203 280/801.2 |
| 5,377,386 A | 1/1995 | Griffith | |
| 5,383,708 A | 1/1995 | Nagasaka et al. | |
| 5,466,044 A | 11/1995 | Barley et al. | |
| 5,487,588 A | 1/1996 | Burleigh et al. | |
| 5,511,856 A | 4/1996 | Merrick et al. | |
| 5,524,928 A | 6/1996 | Monagas | |
| 5,524,965 A | 6/1996 | Barley | |
| 5,536,066 A | 7/1996 | Sedlack | |
| 5,560,565 A | 10/1996 | Merrick et al. | |
| 5,566,978 A | 10/1996 | Fleming | |
| 5,588,189 A | 12/1996 | Gorman et al. | |
| 5,605,375 A | 2/1997 | Friedrich et al. | |
| 5,606,783 A | 3/1997 | Gillis et al. | |
| 5,609,367 A | 3/1997 | Eusebi et al. | |
| 5,611,597 A | 3/1997 | Lanz | |
| 5,628,529 A | 5/1997 | Golz | |
| 5,628,548 A | 5/1997 | Lacoste | |
| 5,669,663 A | 9/1997 | Feuerherdt | |
| 5,695,243 A | 12/1997 | Anthony et al. | |
| 5,700,034 A | 12/1997 | Lane | |
| 5,732,974 A | 3/1998 | Sayles | |
| 5,779,319 A | 7/1998 | Merrick | |
| 5,816,651 A | 10/1998 | Feuerherdt | |
| 5,839,793 A | 11/1998 | Merrick et al. | |
| 5,860,675 A | 1/1999 | Muller | |
| 5,873,599 A | 2/1999 | Bauer et al. | |
| 5,873,635 A | 2/1999 | Merrick | |
| 5,890,762 A | 4/1999 | Yoshida | |
| 5,908,223 A | 6/1999 | Miller | |
| 5,915,787 A | 6/1999 | Brookman | |
| 5,918,834 A | 7/1999 | Siegrist | |
| 5,931,502 A | 8/1999 | Frank | |
| 5,941,601 A | 8/1999 | Scott et al. | |
| 5,979,982 A | 11/1999 | Nakagawa | |
| 5,996,192 A | 12/1999 | Haines et al. | |
| 6,017,087 A | 1/2000 | Anthony et al. | |
| 6,030,046 A | 2/2000 | Dorow | |
| 6,082,819 A | 7/2000 | Jackson | |
| 6,123,391 A | 9/2000 | Boelstler et al. | |
| 6,182,783 B1 | 2/2001 | Bayley | |
| 6,183,044 B1 | 2/2001 | Koyanagi et al. | |
| 6,209,957 B1 | 4/2001 | Baloga et al. | |
| 6,220,662 B1 | 4/2001 | Franco-Vila et al. | |
| 6,260,925 B1 | 7/2001 | Miller | |
| 6,343,837 B1 | 2/2002 | Gage | |
| 6,357,790 B1 | 3/2002 | Swann et al. | |
| 6,402,251 B1 | 6/2002 | Stoll | |
| 6,425,632 B1 | 6/2002 | Anthony et al. | |
| 6,447,060 B1 | 9/2002 | Vila et al. | |
| 6,450,576 B1 | 9/2002 | Rhein et al. | |
| 6,463,638 B1 | 10/2002 | Pontaoe | |
| 6,517,154 B2 | 2/2003 | Sawamoto | |
| 6,543,722 B1 | 4/2003 | Parrow et al. | |
| 6,561,588 B1 | 5/2003 | Brady | |
| 6,616,242 B1 | 9/2003 | Stoll | |
| 6,669,288 B2 | 12/2003 | Nakagawa et al. | |
| 6,694,577 B2 | 2/2004 | Di Perrero | |
| 6,764,135 B2 | 7/2004 | Sasaki et al. | |
| 6,767,057 B2 | 7/2004 | Neelis | |
| 6,767,058 B2 | 7/2004 | McClellan-Derrickson | |
| 6,772,973 B2 | 8/2004 | Fujii et al. | |
| 6,786,510 B2 | 9/2004 | Roychoudhury | |
| 6,802,537 B1 | 10/2004 | Tolefsen | |
| 6,820,310 B2 | 11/2004 | Woodard et al. | |
| 6,962,394 B2 | 11/2005 | Anthony et al. | |
| 6,979,057 B2 | 12/2005 | Sedlack | |
| 7,011,341 B2 | 3/2006 | Herberg et al. | |
| 7,029,067 B2 | 4/2006 | Vits et al. | |
| 7,044,548 B2 | 5/2006 | Mullen et al. | |
| 7,077,475 B2 | 6/2006 | Boyle | |
| 7,144,085 B2 | 12/2006 | Vits et al. | |
| 7,159,285 B2 | 1/2007 | Karlsson | |
| 7,201,399 B2 | 4/2007 | Frank et al. | |
| 7,232,154 B2 | 6/2007 | Desmarais et al. | |
| 7,246,854 B2 | 7/2007 | Dingman et al. | |
| 7,278,684 B2 | 10/2007 | Boyle | |
| 7,347,494 B2 | 3/2008 | Boyle et al. | |
| 7,464,989 B2 | 12/2008 | Merrill | |
| 7,488,038 B2 | 2/2009 | Boyle et al. | |
| 7,770,969 B2 | 8/2010 | Boyle et al. | |
| 7,861,341 B2 | 1/2011 | Ayette | |
| 7,866,702 B2 | 1/2011 | Murphy | |
| 8,002,358 B2 | 8/2011 | Marriott | |
| 8,800,735 B2 | 8/2014 | Ruthenowski | |
| 8,820,789 B2 | 9/2014 | Merrill | |
| 9,004,606 B2 | 4/2015 | Bostrom | |
| 9,499,121 B2 | 11/2016 | Dingman et al. | |
| 9,623,836 B2 | 4/2017 | Kujawa | |
| 9,738,248 B2 | 8/2017 | Dingman et al. | |
| 9,809,193 B2 | 11/2017 | Marriott et al. | |
| 2002/0000744 A1 | 1/2002 | Maciejczyk | |
| 2002/0043830 A1 * | 4/2002 | Sawamoto | B60N 2/2809 297/216.11 |
| 2003/0057750 A1 | 3/2003 | Blackler | |
| 2004/0036345 A1 | 2/2004 | Herberg et al. | |
| 2004/0095004 A1 | 5/2004 | Horton | |
| 2004/0115390 A1 | 6/2004 | Hess et al. | |
| 2005/0269846 A1 | 12/2005 | Vits et al. | |
| 2006/0071535 A1 | 4/2006 | Kim | |
| 2006/0082129 A1 | 4/2006 | Dingman et al. | |
| 2006/0082200 A1 | 4/2006 | Woellert et al. | |
| 2006/0103200 A1 | 5/2006 | Dingman et al. | |
| 2007/0013185 A1 | 1/2007 | Desmarais | |
| 2007/0024103 A1 | 2/2007 | Horton et al. | |
| 2007/0046014 A1 | 3/2007 | Glover | |
| 2007/0120001 A1 | 5/2007 | Esler et al. | |
| 2007/0210639 A1 | 9/2007 | Berger | |
| 2008/0012285 A1 | 1/2008 | Holbein et al. | |
| 2008/0072404 A1 | 3/2008 | Wetter | |
| 2008/0100051 A1 | 5/2008 | Bell et al. | |
| 2008/0100122 A1 | 5/2008 | Bell et al. | |
| 2008/0136141 A1 | 6/2008 | Gray | |
| 2008/0136225 A1 | 6/2008 | Murphy et al. | |

(56) References Cited

U.S. PATENT DOCUMENTS

| | | | |
|---|---|---|---|
| 2008/0203793 A1 | 8/2008 | Boyle et al. | |
| 2008/0303325 A1 | 12/2008 | Scholz | |
| 2010/0219667 A1 | 2/2010 | Humbert et al. | |
| 2010/0253121 A1 | 10/2010 | Buckingham et al. | |
| 2010/0293759 A1 | 11/2010 | Wada | |
| 2011/0133532 A1 | 6/2011 | Zhao | |
| 2012/0054989 A1 | 3/2012 | Eisinger | |
| 2012/0181828 A1 | 7/2012 | Cheng | |
| 2013/0015690 A1 | 1/2013 | Mendis | |
| 2015/0021926 A1 | 1/2015 | Szewczyk et al. | |
| 2015/0314749 A1 | 11/2015 | Moker | |
| 2016/0137160 A1* | 5/2016 | Dingman | B60R 22/201 280/801.2 |
| 2017/0236395 A1 | 8/2017 | Cech | |
| 2017/0267208 A1 | 9/2017 | Marriott et al. | |
| 2017/0283079 A1 | 10/2017 | Meadows et al. | |
| 2018/0170304 A1* | 6/2018 | Wang | B60R 22/18 |
| 2018/0201375 A1 | 7/2018 | Browning | |
| 2018/0312134 A1 | 11/2018 | Jessup et al. | |
| 2019/0001922 A1* | 1/2019 | Wang | B60R 22/28 |
| 2019/0275983 A1 | 9/2019 | Hamilton et al. | |
| 2019/0308584 A1 | 10/2019 | Eaton et al. | |

FOREIGN PATENT DOCUMENTS

| | | |
|---|---|---|
| CA | 2038505 | 11/2000 |
| CA | 2450995 | 12/2003 |
| CA | 2551335 | 12/2006 |
| CN | 110228443 | 9/2019 |
| DE | 1288444 | 1/1969 |
| DE | 2419193 | 11/1975 |
| DE | 2614769 | 10/1977 |
| DE | 3900066 | 7/1989 |
| DE | 4033028 | 4/1992 |
| DE | 9401314 | 4/1994 |
| DE | 19630498 | 2/1998 |
| DE | 19738430 | 3/1999 |
| DE | 10253820 | 6/2004 |
| DE | 102015224611 | 6/2017 |
| EP | 552570 | 12/1992 |
| EP | 560184 | 9/1993 |
| EP | 462930 | 8/1994 |
| EP | 619201 | 10/1994 |
| EP | 619202 | 10/1994 |
| EP | 646491 | 4/1995 |
| EP | 703113 | 3/1996 |
| EP | 714806 | 6/1996 |
| EP | 841209 | 5/1998 |
| EP | 970842 | 1/2000 |
| EP | 982182 | 1/2000 |
| EP | 1059194 | 12/2000 |
| EP | 1193111 | 4/2002 |
| EP | 1231100 | 8/2002 |
| EP | 1472949 | 11/2004 |
| EP | 1631166 | 9/2008 |
| EP | 3564077 | 11/2019 |
| FR | 2857601 | 1/2005 |
| GB | 2009588 | 6/1979 |
| GB | 2444591 | 6/2008 |
| JP | 5254367 | 10/1993 |
| JP | 10119611 | 5/1998 |
| JP | 10119612 | 5/1998 |
| JP | 2001030811 | 2/2001 |
| JP | 6025361 | 11/2016 |
| WO | 9702164 | 1/1997 |
| WO | 03009717 | 2/2003 |
| WO | 03010024 | 2/2003 |
| WO | 03010035 | 2/2003 |
| WO | 2005000625 | 1/2005 |
| WO | 2005037605 | 4/2005 |
| WO | 2005102112 | 11/2005 |
| WO | 2006044559 | 4/2006 |
| WO | 2006044627 | 4/2006 |
| WO | 2006044809 | 4/2006 |
| WO | 2006044830 | 4/2006 |

OTHER PUBLICATIONS

Improving the Safety of Older Child Passengers, Nov. 2005.
International Search Report and Written Opinion for PCT Application No. PCT/US2007/66476, Applicant: AmSafe Commercial Products, Inc., dated Jan. 25, 2008, 10 pages.
International Search Report and Written Opinion for PCT Application No. PCT/US2009/31613, Applicant: AmSafe Commercial Products, Inc., dated Mar. 3, 2009, 9 pages.
International Search Report and Written Opinion for PCT Application No. PCT/US2009/58806; Applicant: AmSafe, Inc.; dated Jan. 20, 2010, 10 pages.
Restraint Use on Aircraft, American Academy of Pediatrics vol. 108, No. 5, Nov. 2001.
Safefit, Cover N' Carry Car Seat Protector, www.Amazon.com, accessed from internet: Feb. 9, 2006, 3 pages.
Safer Airplane Travel with Babies & Toddlers Fact Sheet, Safe Ride News Publications 2003, accessed from internet: Mar. 16, 2006, 4 pages.
Tiny Air Travelers at Risk, Brad Watson Reports, Jan. 26, 2006.
Ultimate Black Car Seat Travel Bag, www.target.com, accessed from internet: Feb. 9, 2006, 2 pages.
Wheelie Car Seat Travel Bag by JL Childress, www.Go-Baby.com, accessed from internet: Mar. 22, 2006, 2 pages.
International Search Report and Written Opinion for PCT Application No. PCT/US2019/25513, Applicant: Shield Restraint Systems, Inc., dated Jun. 21, 2019, 8 pages.
Translation of DE 102015224611, Published Jun. 8, 2017, accessed at www.espace.com on Aug. 7, 2020 (Year: 2017).

* cited by examiner

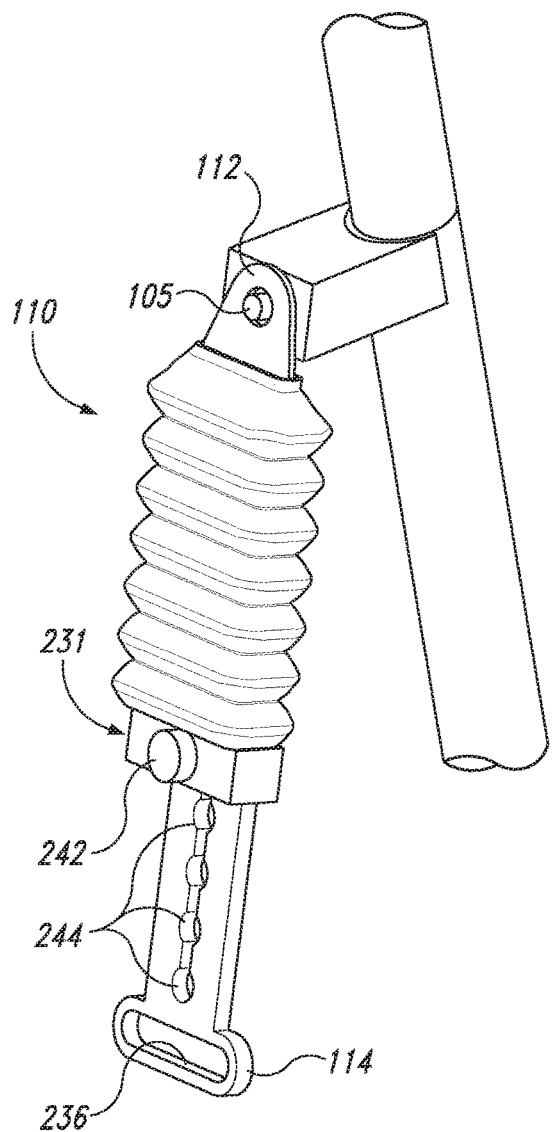
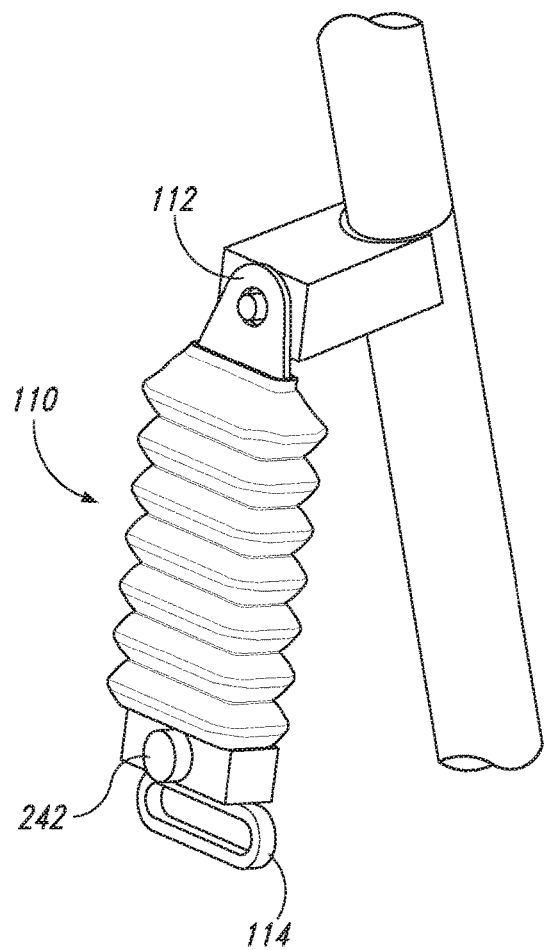
Fig. 2A
Fig. 2B

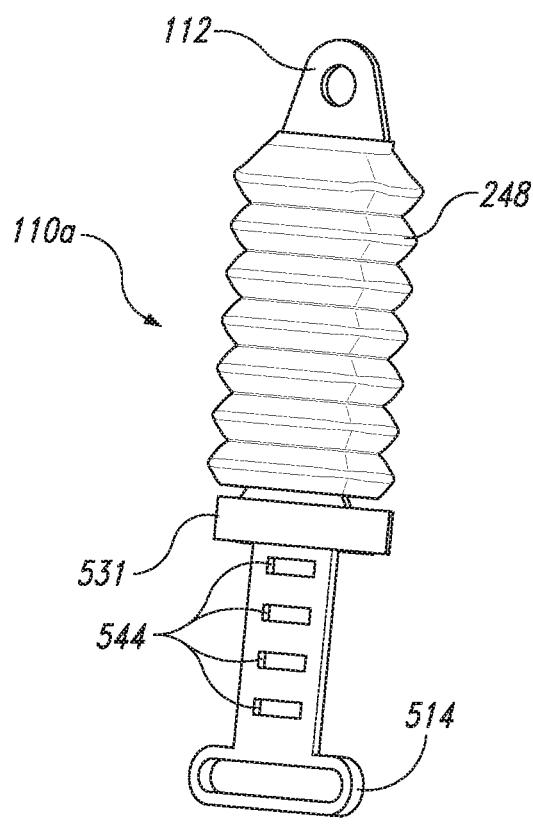
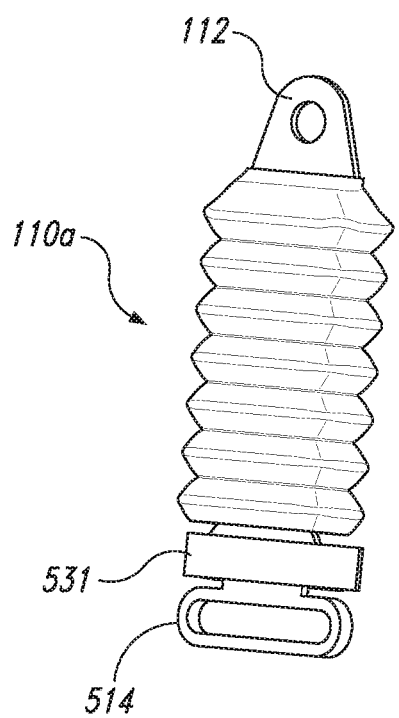
Fig. 5A  Fig. 5B
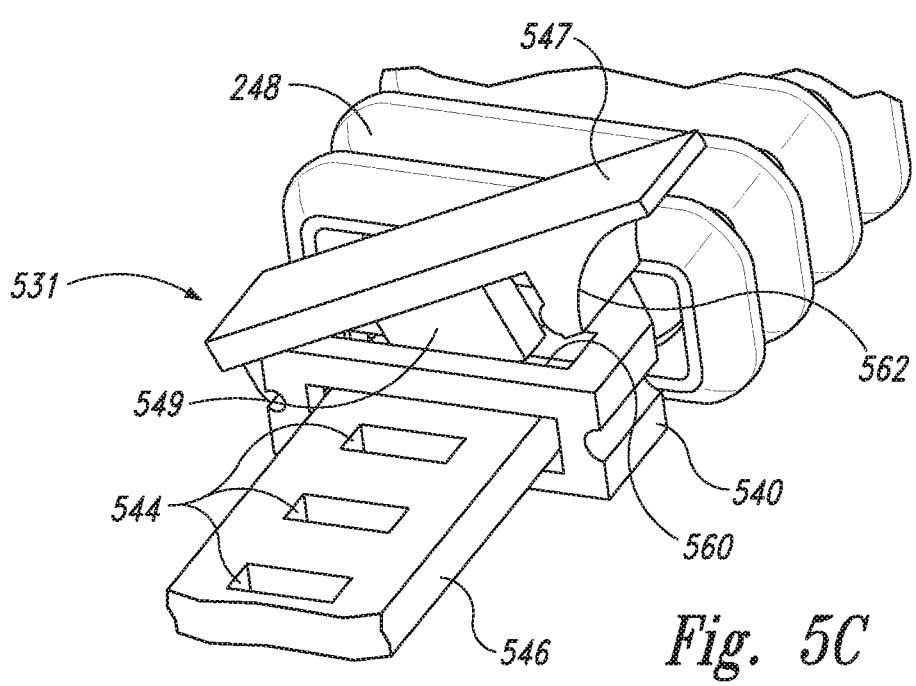
Fig. 5C

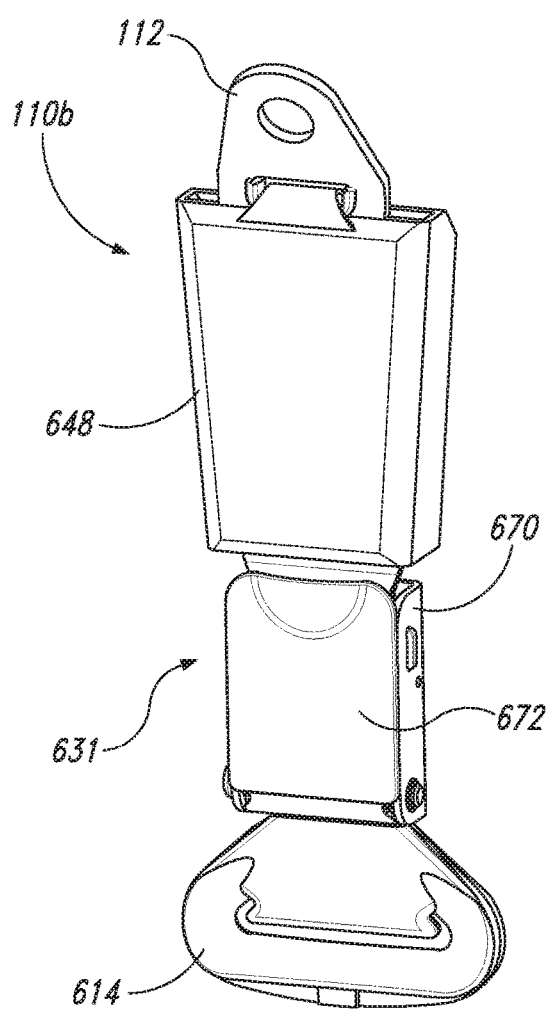
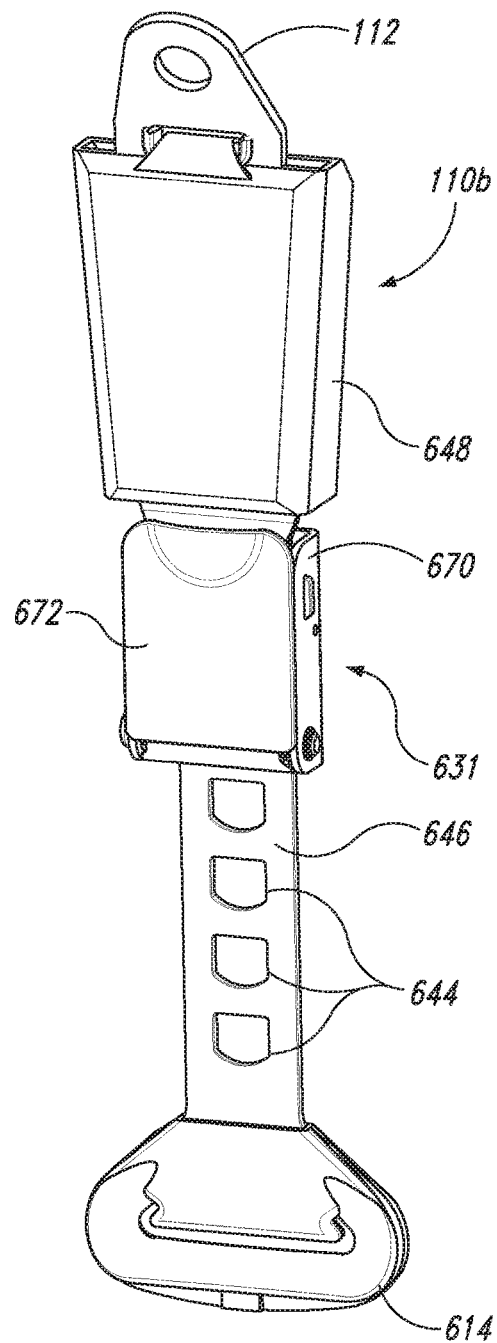
Fig. 6A
Fig. 6B

HEIGHT ADJUSTERS WITH ANTI-CINCH FEATURES FOR OCCUPANT RESTRAINT SYSTEMS

CROSS-REFERENCE TO RELATED APPLICATION

This application claims the benefit of U.S. Provisional Patent Application No. 62/639,251, titled "HEIGHT ADJUSTERS WITH BUILT-IN ANTI-CINCH FOR OCCUPANT RESTRAINT SYSTEMS," and filed Mar. 6, 2018, the disclosure of which is hereby incorporated by reference in its entirety.

TECHNICAL FIELD

The present disclosure is generally related to web height adjusters for use in vehicle occupant restraint systems.

BACKGROUND

Seat belts for use in cars, trucks, utility task vehicles (UTVs) and other vehicles often include a turning loop or D-ring near the occupant's shoulder to support the shoulder web. Typically the seat belt web will extend upwardly from a retractor, around the D-ring, and then downwardly at an angle across the occupant's torso. In the event of a collision or other rapid deceleration event that causes locking of the retractor, the D-loop acts as a rigid anchor for the shoulder web and resists forward motion of the occupant.

In use, some situations can require significant tension in the shoulder web to properly restrain the occupant, and this tension can result in substantial discomfort. For example, in recreational utility vehicles (RUVs) or UTVs, aggressive driving in off-road conditions can result in repeated application of high tension loads in the web, causing discomfort and/or fatigue for the operator. U.S. Pat. No. 9,809,193, assigned to Shield Restraint Systems, Inc., discloses shock absorbing height adjusters for use with restraint systems, and is incorporated herein by reference in its entirety.

BRIEF DESCRIPTION OF THE DRAWINGS

FIGS. 2A and 2B are isometric views of the shock absorbing height adjuster of FIG. 1 in two different operational positions.

FIGS. 5A and 5B are isometric views of a shock absorbing height adjuster configured in accordance with another embodiment of the present technology, and FIG. 5C is an enlarged isometric view of a D-ring locking feature of the height adjuster of FIGS. 5A and 5B.

FIGS. 6A and 6B are isometric views of a shock absorbing height adjuster configured in accordance with another embodiment of the present technology.

DETAILED DESCRIPTION

Figure 1:
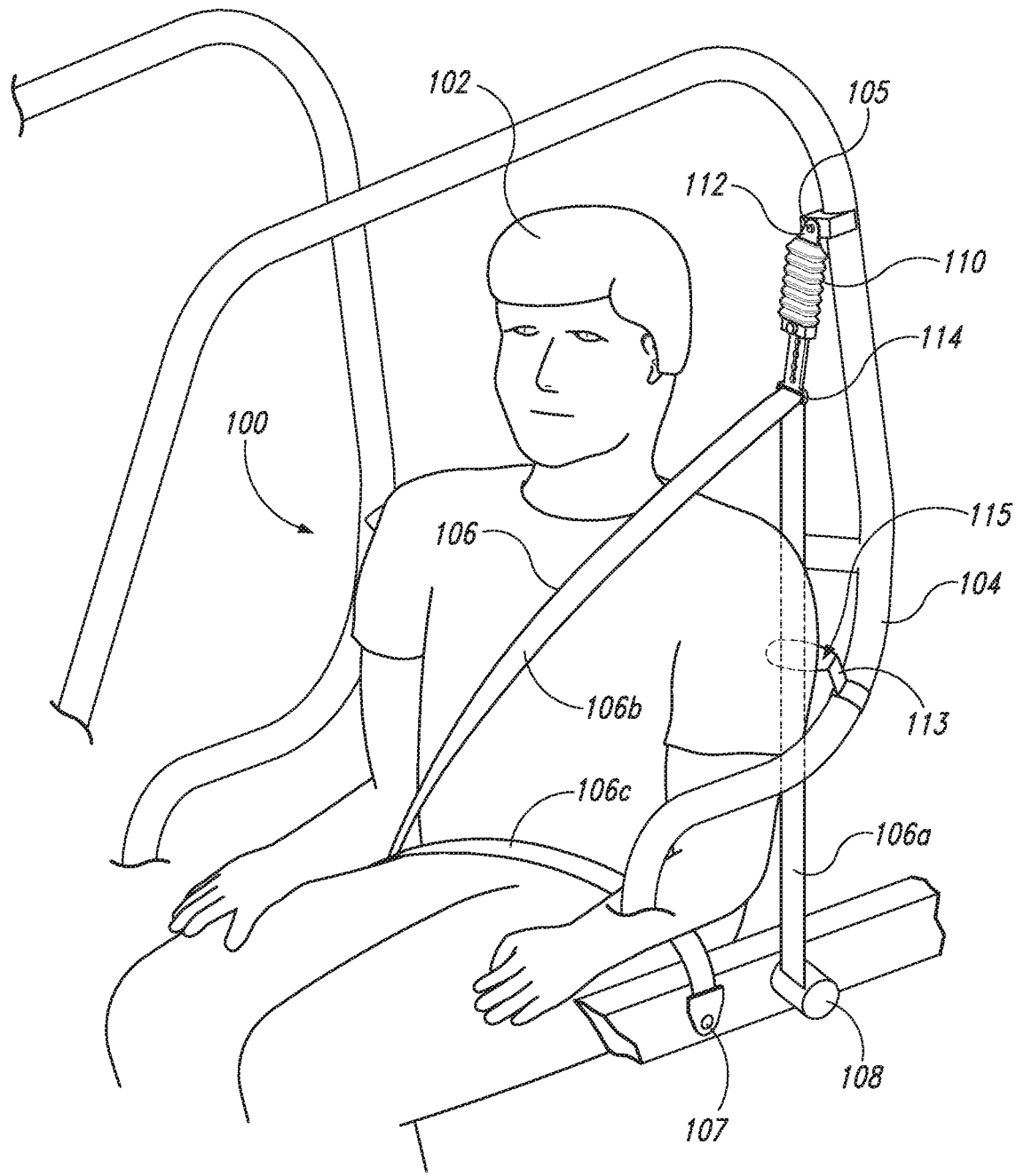
FIG. 1 is an isometric view of an occupant restraint system having a shock absorbing height adjuster configured in accordance with an embodiment of the present technology.

The following disclosure describes various embodiments of shock absorbing seat belt height adjusters and associated systems and methods. In some embodiments, a shock absorbing height adjuster can be attached to an anchor point on a vehicle frame near the occupant's shoulder, and can include a D-ring operably coupled to an anti-cinch feature. The D-ring can support a shoulder web of an occupant restraint, and can include a series of holes, slots or other adjustment features that enable the occupant to adjust the height of the D-ring to suit their comfort. The anti-cinch feature can include one or more elastic web portions that enable the D-ring to elastically respond to tension loads in the shoulder web. Embodiments of the shock absorbing height adjusters described herein can include various types of locking features for securing the D-ring at a desired position relative to the anchor point. For example, such locking features can include a pin that can be inserted into a desired hole in the D-ring to secure the D-ring in a selected position, or a latch device having a tang that inserts through a desired slot in the D-ring to secure the D-ring in a selected position.

Certain details are set forth in the following description and in FIGS. 1-6C to provide a thorough understanding of various embodiments of the present technology. In other instances, well-known structures, materials, operations and/or systems often associated with vehicle occupant restraint systems, including seat belts, web retractors, buckles, adjusters, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a vehicle occupant restraint system 100 having a shock absorbing height adjuster 110 ("height adjuster 110") configured in accordance with an embodiment of the present technology. In the illustrated embodiment, the restraint system 100 is mounted to a vehicle (e.g., a UTV) having a vehicle frame 104. The height adjuster 110 includes an anchor 112 that is fixedly attached to an anchor point 105 on the vehicle frame 104 above the shoulder of an occupant 102. As described in greater detail below, the height adjuster 110 includes a D-ring 114 that is able to move upwardly and downwardly a limited distance in response to tension loads on a restraint web 106. In the illustrated embodiment, the restraint web 106 extends upwardly from a web retractor 108 and passes through the D-ring 114 before extending downwardly across the occupants torso to connect to, e.g., a seat belt buckle (not shown) positioned on the opposite side of the occupant 102. From the seat belt buckle, the restraint web 106 extends across the lap of the occupant 102 and is attached to a lower anchor point 107. The foregoing routing subdivides the restraint web 106 into a first web portion 106a, a second web portion 106b forming a shoulder strap or shoulder web, and a third web portion 106c forming a lap web. In other embodiments, the height adjuster 110 and various features thereof described herein can be used with other restraint systems and, in other vehicles and in other mounting positions without departing from the present disclosure.

In some embodiments, the restraint system 100 can further include a web guide 113 coupled to the vehicle frame 104. The web guide 113 can include a slot 115 configured to receive the web 106 (e.g., the first web portion 106a) therethrough. In operation, the arm 113 can limit fore and aft movement of the first web portion 106a—and thereby the height adjuster 110—toward the front or rear of the vehicle in response to tension loads on the web 106.

Figure 2C:
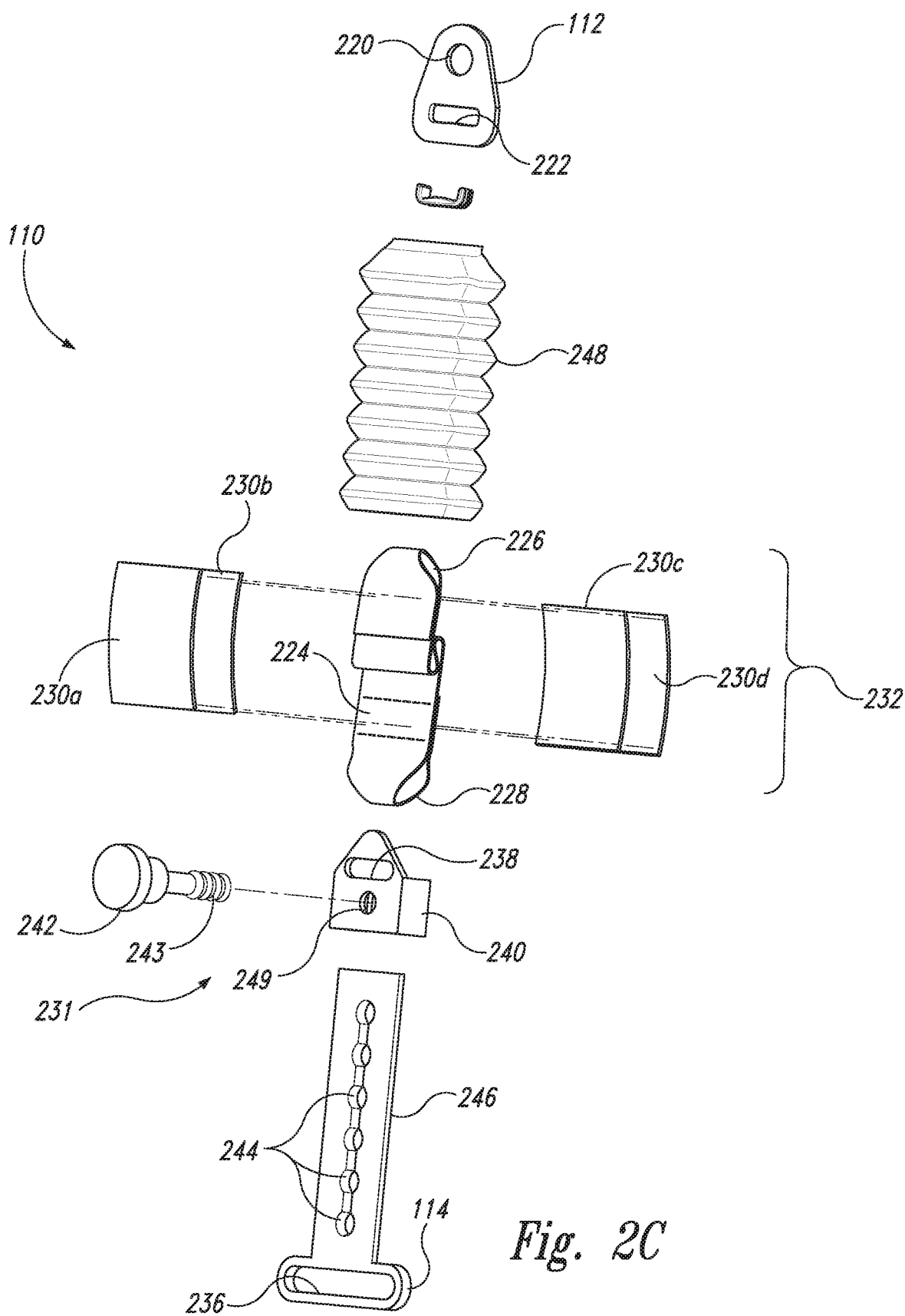
FIG. 2C is an exploded isometric view of the shock absorbing height adjuster.
Figure 2D:
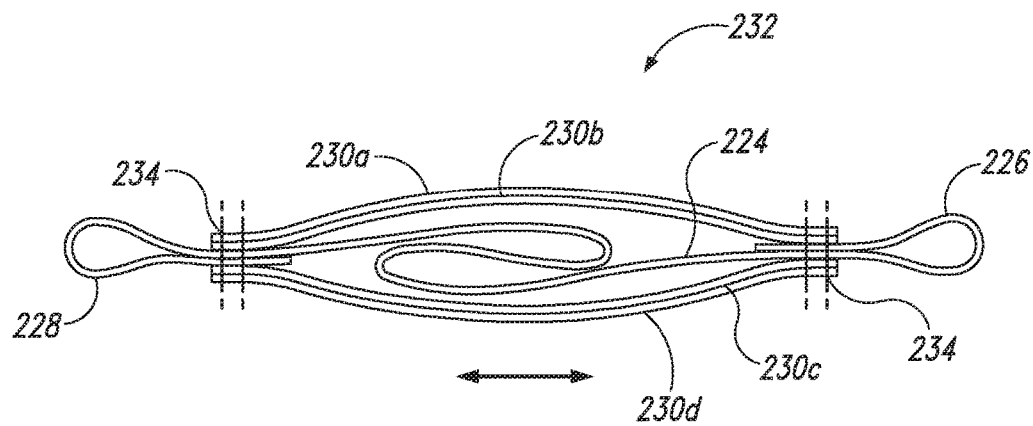
FIG. 2D is a side view of an anti-cinch feature of the shock absorbing height adjuster configured in accordance with an embodiment of the present technology.

FIGS. 2A and 2B are isometric views of the shock absorbing height adjuster 110 ("height adjuster 110") in two different operational positions, FIG. 2C is an exploded isometric view of the height adjuster 110, and FIG. 2D is a side view of an anti-cinch feature 232 (which can also be referred to herein as an energy absorbing feature, shock absorber, etc.) of the height adjuster 110 configured in accordance with an embodiment of the present technology. Referring to FIGS. 2A and 2C together, in the illustrated embodiment the anti-cinch feature 232 operably couples the D-ring 114 to the anchor 112. The anchor 112 includes an aperture 220 that receives a fastener (e.g., a bolt, such as a hex bolt) that attaches the anchor 112 to the anchor point 105 on the vehicle frame 104. The anti-cinch feature 232 of the illustrated embodiment includes a web 224 having a first end portion 226 and a second end portion 228. The first end portion 226 includes an attachment loop (e.g., a portion of web material that is formed in a loop and stitched to itself) that extends through a web aperture 222 in the anchor 112 to couple the web 224 to the anchor 112. The second end portion 228 of the web 224 includes an attachment loop that passes through a web aperture 238 in a D-ring guide 240 to secure the web 224 to an adjuster assembly 231. The web 224 can be a conventional seat belt web using conventional material, such woven nylon.

Referring to FIGS. 2C and 2D together, the anti-cinch feature 232 can additionally include a plurality of elastic web portions 230a-230d that are stitched or otherwise securely attached on opposite sides of the web 224. More specifically, in the illustrated embodiment the web 224 is folded back on itself, and the end portions 226 and 228 of the web 224 are stitched or otherwise securely attached to the adjacent end portions of the elastic web portions 230a-d by stitching 234. As a result of this construction, the length of the web 224 position between the elastic web portions 230a-d will be greater than the lengths of the elastic web portions 230a-d, so that when a load is applied to the opposite end portions of the web 224, the load will initially pass through the elastic web portions 230a-d causing them to elastically extend. The elastic web portions 230a-d will extend until the web 224 has fully unfolded, at which point the web 224 will carry most of the load in the anti-cinch feature 232. The anti-cinch feature 232 can be enclosed in a suitable cover 248, such as a rubber cover having accordion features that enable the cover to expand and contract with the anti-cinch feature 232 while protecting the anti-cinch feature from exposure to dirt, water, mud, etc.

In the illustrated embodiment, the D-ring 114 includes a web aperture 236 that is configured to slidably receive the restraint web 106 as show in FIG. 1. Additionally, the D-ring 114 includes an elongate tang 246 having a series of adjustment holes 244. To operably couple the D-ring 114 to the D-ring guide 240 and, in turn, to the web 224, the tang 246 is inserted into the D-ring guide 240 until an aperture 249 in the D-ring guide 240 is aligned with a selected adjustment hole 244. The adjuster assembly 231 includes a pin 242 (which can also be referred to herein as an engagement member) that is movably inserted through the aperture 249 and coupled to the D-ring guide 240. The pin 242 is biased towards the tang 246 by a biasing member 243 (e.g., a coil spring) that is operably coupled between the pin 242 and the D-ring guide 240. To couple the D-ring 114 to the D-ring guide 240 at a desired height, the pin 242 is pulled partially outward from the D-ring guide 240 so that a distal end portion of the pin 242 is withdrawn from the corresponding adjustment hole 244, and the D-ring is slid up or down in the D-ring guide 240 to the desired position. The pin 242 can then be released so that the distal end portion of the pin is received by and engages the desired hole 244 in the tang 246 to lock the D-ring 114 in position.

As shown in FIG. 2A, the D-ring 114 can be moved to the lower-most position by withdrawing the pin 242, sliding the D-ring 114 downwardly, and releasing the pin 242 so that it engages the uppermost hole 244 on the tang 246. To raise the D-ring 114 to the highest position as shown in FIG. 2B, the pin 242 is withdrawn and the D-ring 114 pushed upwardly through the D-ring guide 240 so that the pin 242 can be engaged with the lowermost hole 244 in the tang 246. In use, the D-ring 114 will elastically move away from the anchor 112 in response to tension loads in the shoulder web portion 106b of the restraint system 100 (FIG. 1) because of the elasticity of the anti-cinch feature 232. The ability to elastically respond to these loads can reduce the shock on the seat occupant 102 and corresponding discomfort from the shoulder web portion 106b. However, as the D-ring 114 continues to move away from the anchor 112, the web 224 (FIG. 2C) will ultimately fully unfurl so that it reacts all or at a portion of the tension load in the shoulder web portion 106b.

Figure 3:
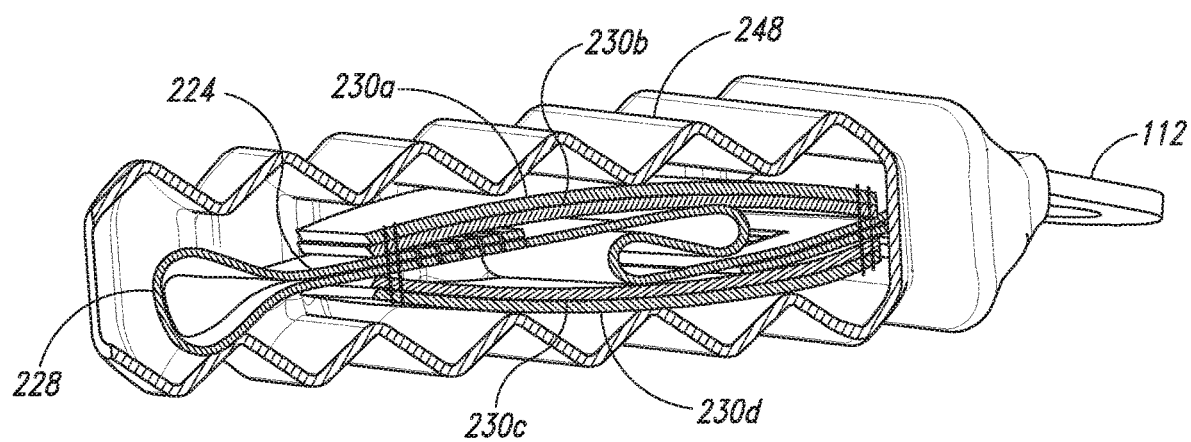
FIG. 3 is a cross-sectional isometric view of the anti-cinch feature of FIGS. 2C and 2D.

FIG. 3 is a cross-sectional isometric view of a portion of the height adjuster 110 showing the anti-cinch feature 232 enclosed in the cover 248.

Figure 4:
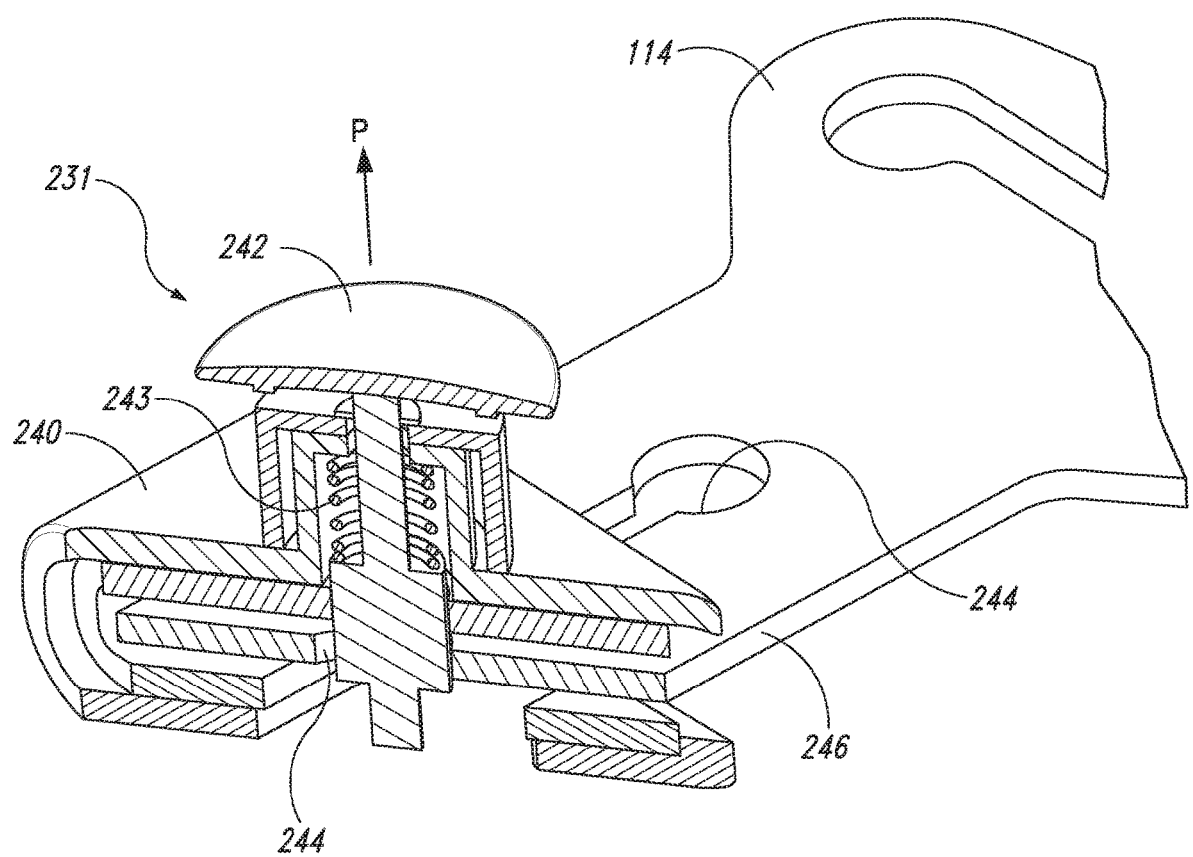
FIG. 4 is a cross-sectional end view of a D-ring locking feature configured in accordance with an embodiment of the present technology.

FIG. 4 is an enlarged, cross-sectional end view of the adjuster assembly 231 configured in accordance with an embodiment of the present technology. In the illustrated embodiment, the pin 242 is biased towards the tang 246 of the D-ring 114 by the biasing member 243. To disengage the tang 246 from the D-ring guide 240 so that the height of the D-ring 114 can be adjusted, the pin 242 is pulled outwardly in direction P to withdraw the distal end portion of the pin 242 from the corresponding adjustment hole 244 in the tang 246. With the distal end portion of the pin 242 in the withdrawn position (not shown), the tang 246 can be slid upwardly or downwardly in the D-ring guide 240 to the desired location, the pin 242 is then released so that the distal end portion engages the desired adjustment hole 244 to lock the D-ring 114 in position.

FIGS. 5A and 5B are isometric views of a shock absorbing height adjuster 110a ("height adjuster 110a") configured in accordance with another embodiment of the present technology, and FIG. 5C is an enlarged isometric view of an adjuster assembly 531 of the height adjuster 110a. Referring to FIG. 5A-5C together, the height adjuster 110a is generally similar in structure and function to the height adjuster 110 described in detail above. For example, the height adjuster 110a includes a D-ring 514 that is operably coupled to the anchor 112 by means of the anti-cinch feature 232 described above (not shown in FIGS. 5A-5C, but understood to be enclosed within the cover 248). In the illustrated embodiment, however, the height adjuster 110a differs from the height adjuster 110 in that the height adjuster 110a includes an adjuster assembly 531 having a latch 547 that is pivotally coupled to a D-ring guide 540. The D-ring guide 540 is operably coupled to the web 224 (FIG. 2C) in the same manner described above for the D-ring guide 240. In this embodiment, however, the D-ring guide 540 includes a slot 560 that receives a stop member 549 (which can also be referred to as an engagement member) of the latch 547. The stop member 549 can selectively engage a desired slot 544 in a tang 546 of the D-ring 514. To adjust the height of the D-ring 514, the tang 546 is slid into or out of the D-ring guide 540 until the D-ring 514 is at a desired height, and then the latch 547 can be rotated toward the tang 546 so that the stop member 549 engages the desired slot 544 to lock the D-ring 514 at the desired height.

Figure 6C:
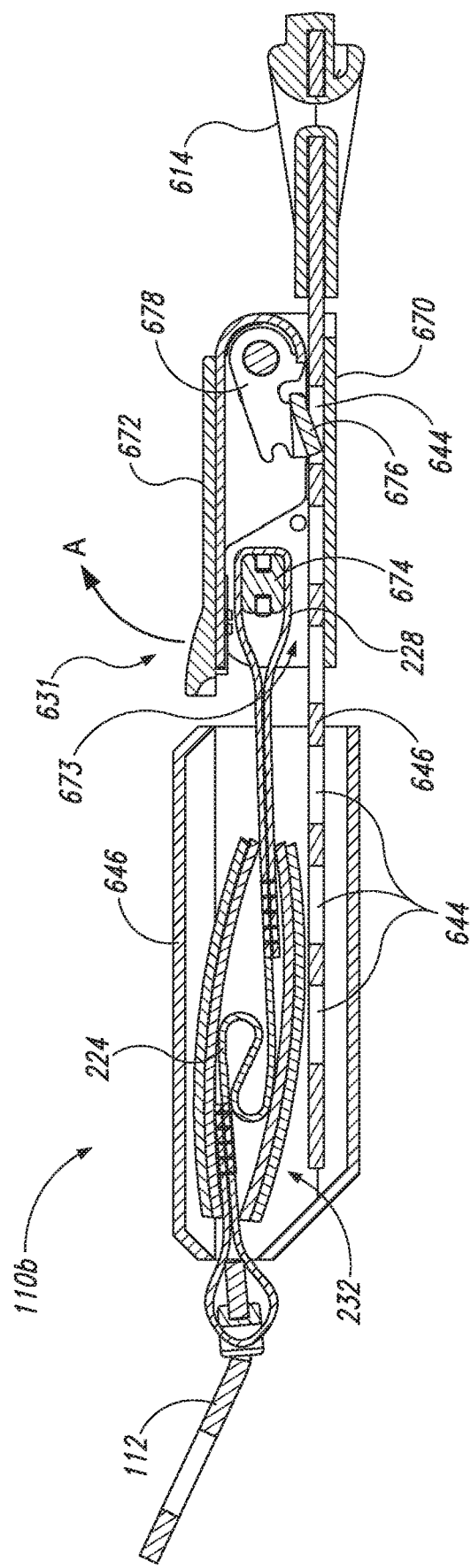
FIG. 6C is a cross-sectional side view of the height adjuster.

FIGS. 6A and 6B are isometric views of a shock absorbing height adjuster 110b ("height adjuster 110b") in an upper and a lower position, respectively, in accordance with another embodiment of the present technology. FIG. 6C is a cross-sectional side view of the height adjuster 110b in the upper position. Referring to FIGS. 6A-6C together, the height adjuster 110b is generally similar in structure and function to the height adjusters 110 and 110a described in detail above. For example, the height adjuster 110b includes a D-ring 614 that is operably coupled to the anchor 112 by means of the anti-cinch feature 232 described above (shown enclosed within a cover 648 in FIGS. 6A-6C).

In the illustrated embodiment, however, the height adjuster 110b differs from the height adjusters 110 and 110a in that the height adjuster 110b includes an adjuster assembly 631 having a frame 670 that pivotally supports a release actuator 672 (which can also be referred to herein as a lift lever). The frame 670 defines an opening or channel 673 that slidably receives a tang 646 of the D-ring 614. The adjuster assembly 631 further includes a cross bar 674 coupled to the frame 670. The second end portion 228 of the web 224 includes an attachment loop that passes around the cross bar 674 to secure the web 224 to the adjuster assembly 631. The release actuator 672 can operate a pawl 676 (which can also be referred to as an engagement member) via a cam member 678. The pawl 676 is configured to selectively engage (e.g., project into) a desired hole 644 in the tang 614 to lock the position of the D-ring 614 relative to the adjuster assembly 631. In FIG. 6C, for example, the pawl 676 is shown projecting into a lowermost one of the holes 644 to lock the D-ring 614 in the upper position. In some embodiments, the adjuster assembly 631 includes a biasing member (e.g., a torsion spring; not shown) configured to bias the cam member 678 and pawl 676 toward the D-ring 614 such that D-ring 614 remains locked in position absent actuation of the release actuator 672.

To adjust the height of the D-ring 614, the release actuator 672 can be rotated away from the tang 614 in a direction A as indicated by arrow A in FIG. 6C to disengage the pawl 676 from a corresponding one of the holes 644 and to permit/enable the tang 614 to be slid through the opening 673 of the adjuster assembly 631. When the D-ring 614 is at a desired position (e.g., when the shoulder web portion 106b of the restraint system 100 (FIG. 1) is at a desired height), the release actuator 672 can be rotated toward the tang 614 so that the pawl 676 engages the desired hole 644 to lock the D-ring 614 at the desired position. In some embodiments, upon releasing the release actuator 672, the biasing member can automatically rotate the pawl 676 back toward the desired hole 644 to lock the D-ring 614 at the desired position. Although the foregoing discussion describes one embodiment of a clamp that can be used with the present height adjuster technology, it will be understood that the technology described herein is not limited to this particular type of web adjuster, and can be used with virtually any type of suitable clamp known to those of ordinary skill in the art.

Some of the embodiments of the height adjusters described herein have various advantages. For example, some embodiments include build in anti-cinch features that reduce shock loads on the seat occupant. Other embodiments are very durable and can withstand high shock loads and use in harsh environments, such as off-road conditions with direct exposure to dirt, mud, sun, water, etc. Additionally, some embodiments enable the height of the D-ring to be easily adjusted and can provide multiple adjustment options, regardless of the operating conditions.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A shock absorbing height adjuster for use with an occupant restraint system, the height adjuster comprising:
   an anchor configured to be fixedly attached to a vehicle frame;
   a D-ring configured to slidably receive a web of the occupant restraint system;
   an anti-cinch feature operably coupling the D-ring to the anchor, wherein the anti-cinch feature includes a web folded back on itself and having a first end portion and a second end portion, wherein the first end portion is attached to the anchor; and
   an adjuster assembly operably coupled to the second end portion of the anti-cinch feature, wherein the adjuster assembly is operable to (a) lock the D-ring at a first position relative to the anchor and (b) enable adjustment of the D-ring to a second position, different than the first position, relative to the anchor.

2. The shock absorbing height adjuster of claim 1 wherein the D-ring includes a tang having a plurality of adjustment holes, and wherein the adjuster assembly includes an engagement member configured to engage a corresponding one of the adjustment holes to lock the D-ring at the first position and the second position.

3. The shock absorbing height adjuster of claim 2 wherein the adjuster assembly includes a biasing member, and wherein the biasing member biases the engagement member toward the tang.

4. The shock absorbing height adjuster of claim 2 wherein the engagement member is a pin configured to be inserted into a corresponding one of the adjustment holes to lock the D-ring at the first position, and wherein the pin is removable from the corresponding one of the adjustment holes to enable adjustment of the D-ring to the second position.

5. The shock absorbing height adjuster of claim 4 wherein the adjuster assembly includes a biasing member, and wherein the biasing member biases the engagement member toward the tang.

6. The shock absorbing height adjuster of claim 2 wherein the adjuster assembly includes a latch coupled to the engagement member, and wherein the latch is pivotable to disengage the engagement member from the corresponding one of the adjustment holes to enable adjustment of the D-ring to the second position.

7. The shock absorbing height adjuster of claim 1 wherein the anti-cinch feature includes a plurality of elastic web portions, wherein the first and second end portions of the web are securely attached to adjacent end portions of the elastic web portions, and wherein the elastic web portions are configured to elastically extend when a tension load is transmitted to the D-ring.

8. The shock absorbing height adjuster of claim 1 wherein the D-ring includes a tang having a plurality of adjustment holes, and wherein the adjuster assembly is configured to engage a corresponding one of the adjustment holes to lock the D-ring at the first position and the second position.

9. The shock absorbing height adjuster of claim 1 wherein the D-ring includes a tang having a plurality of adjustment holes, wherein the adjuster assembly includes a pawl coupled to a lift lever, wherein the pawl is configured to engage a corresponding one of the adjustment holes to lock the D-ring at the first position relative to the anchor, and wherein the lift lever is configured to be grasped by a user and rotated to disengage the pawl from the corresponding one of the adjustment holes to enable movement of the D-ring from the first position to the second position.

10. A height adjuster for absorbing energy in a restraint web of a vehicle occupant restraint system, the height adjuster comprising:
an anchor configured to be fixedly attached to an anchor point of the vehicle;
a D-ring having a web aperture configured to slidably receive the restraint web;
an energy absorber operably coupled to the anchor, wherein the energy absorber includes at least one elastic web portion operably coupled between the D-ring and the anchor, wherein the at least one elastic web portion enables the D-ring to move elastically downwardly relative to the anchor when a tension load is applied to the restraint web; and
an adjuster assembly operably coupling the D-ring to the energy absorber and configured to enable movement of the D-ring from a first position relative to the energy absorber to a second position relative to the energy absorber.

11. The height adjuster of claim 10 wherein the D-ring includes a tang having a plurality of adjustment holes, wherein the adjuster assembly includes a pawl coupled to a lift lever, wherein the pawl is configured to engage a corresponding one of the adjustment holes to lock the D-ring relative to the energy absorber, and wherein the lift lever is configured to be grasped by a user and rotated to disengage the pawl from the corresponding one of the adjustment holes to enable movement of the D-ring from the first position to the second position.

12. The height adjuster of claim 10 wherein the adjuster assembly is configured to be actuated by the vehicle occupant to enable movement of the D-ring from the first position to the second position.

13. A height adjuster for absorbing energy in a restraint web of a vehicle occupant restraint system, the height adjuster comprising:

an anchor configured to be fixedly attached to an anchor point of the vehicle;

an energy absorber operably coupled to the anchor;

a D-ring having a web aperture configured to slidably receive the restraint web;

an adjuster assembly operably coupling the D-ring to the energy absorber and configured to enable movement of the D-ring from a first position relative to the energy absorber to a second position relative to the energy absorber, wherein the energy absorber is configured to enable the D-ring to move elastically downwardly relative to the anchor when a tension load is applied to the restraint web; and a D-ring guide, wherein the energy absorber includes a web having a first end portion attached to the anchor and a second end portion attached to the D-ring guide, and wherein the D-ring guide couples the adjuster assembly to the web.

14. The height adjuster of claim 13 wherein the D-ring includes a tang having a plurality of adjustment holes, wherein the D-ring guide includes an aperture, and wherein the adjuster assembly includes an engagement member configured to project through the aperture in the D-ring guide and engage one of the adjustment holes to lock the position of the D-ring relative to the energy absorber.

15. The height adjuster of claim 14 wherein the tang is slidably mounted within the D-ring guide.

16. The height adjuster of claim 13 wherein the adjuster assembly comprises a latch pivotally coupled to the D-ring guide, wherein the latch is coupled to an engagement member, and wherein the engagement member is configured to project through an aperture in the D-ring guide and into an adjustment hole in the D-ring to lock the D-ring relative to the energy absorber.

* * * * *